United States Patent
Matsunaga (10) Patent No.: US 6,775,396 B2
(45) Date of Patent: Aug. 10, 2004

(54) IMAGE PROCESSING DEVICE, PLANE DETECTION METHOD, AND RECORDING MEDIUM UPON WHICH PLANE DETECTION PROGRAM IS RECORDED

(75) Inventor: Shinichi Matsunaga, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 691 days.

(21) Appl. No.: 09/809,064

(22) Filed: Mar. 16, 2001

(65) Prior Publication Data

US 2001/0032041 A1 Oct. 18, 2001

(30) Foreign Application Priority Data

Mar. 17, 2000  (JP) .................................... P2000-077045

(51) Int. Cl.[7] ................................................. G06K 9/00
(52) U.S. Cl. ...................... 382/106; 382/154; 382/281; 382/153; 701/28
(58) Field of Search ............................... 382/154, 106, 382/103, 153, 168, 104, 281; 701/23, 28; 348/113; 340/435, 440, 937

(56) References Cited

U.S. PATENT DOCUMENTS 5,825,915 A * 10/1998 Michimoto et al. ......... 382/154
5,832,138 A * 11/1998 Nakanishi et al. .......... 382/281
5,867,592 A * 2/1999 Sasada et al. ............... 382/154
6,487,303 B1 * 11/2002 Yamaguchi et al. ........ 382/103

FOREIGN PATENT DOCUMENTS

| JP | A7271978 | 10/1995 |
| JP | A868967 | 3/1996 |
| JP | A 10143659 | 5/1998 |

* cited by examiner

Primary Examiner—Bhavesh M. Mehta
Assistant Examiner—John Strege
(74) Attorney, Agent, or Firm—Birch, Stewart, Kolasch & Birch, LLP (57) ABSTRACT

The image processing device includes: a distance image capture device which captures a distance image based upon three dimensional coordinate values obtained, by measuring the distances to various points upon body surfaces in the forward visual field of a distance sensor, for those points upon those body surfaces; a straight line extraction device which obtains three dimensional coordinate values of two points from a viewpoint picture element in the distance image and a picture element which is separated by a predetermined distance from that viewpoint picture element, and which extracts a plurality of straight lines in a horizontal plane using two dimensional coordinate values by ignoring the vertical component among these three dimensional coordinate values; and a plane detection device which obtains points on the body surfaces which lie upon various straight lines which have been extracted by the straight line extraction device, and detects points which lie upon the same straight line as being upon the same vertical plane.

10 Claims, 5 Drawing Sheets

FIG. 4B
HORIZONTAL PLANE MASK

FIG. 4A
VERTICAL PLANE MASK

IMAGE PROCESSING DEVICE, PLANE DETECTION METHOD, AND RECORDING MEDIUM UPON WHICH PLANE DETECTION PROGRAM IS RECORDED

BACKGROUND OF THE INVENTION

1. Field of the Invention

The present invention relates to an image processing device, a plane detection method, and a recording medium upon which a plane detection program is recorded, which, using a distance image, perform detection of planes which correspond to walls, a floor or a road surface, as required when a robot or vehicle moves.

2. Description of the Related Art

In the prior art, it is general to use Hough conversion as a method of detecting straight lines in a two dimensional plane. Accordingly, in order to detect planes in a three dimensional space by applying this method, it is necessary to sort (ballot) all the points in the three dimensions in a parameter space, and the problem arises that the amount of memory used for this sorting becomes inflated. Furthermore, since sorting is also performed for parameters of surfaces which do not exist in practice, the further problem arises that a very large number of candidates for planes exist, so that a great amount of processing time is required for the plane detection processing.

BRIEF SUMMARY OF THE INVENTION

The present invention has been conceived in view of this sort of circumstance, and its objective is to propose an image processing device, a plane detection method, and a recording medium upon which a plane detection program is recorded, which can perform the required detection of planes in a simple manner when a robot or vehicle moves autonomously.

The invention of the first aspect comprises: a distance image capture device (for example, the distance image capture section 1 of the embodiment) which captures a distance image based upon three dimensional coordinate values obtained for various points upon body surfaces by measuring the distances to said points upon said body surfaces in the forward visual field of a distance sensor; a straight line extraction device (for example, the steps S1 through S6 performed by the vertical plane extraction section of the embodiment) which obtains three dimensional coordinate values of two points from a viewpoint picture element in said distance image and a picture element which is separated by a predetermined distance from said viewpoint picture element, and which extracts a plurality of straight lines in a horizontal plane using two dimensional coordinate values by ignoring the vertical component among these three dimensional coordinate values; and a plane detection device (for example, the step 7 performed by the vertical plane extraction section of the embodiment) which obtains points upon said body surfaces which lie upon various straight lines which have been extracted by said straight line extraction device, and which detects points which lie upon the same straight line as being upon the same vertical plane.

According to the invention of the first aspect since it is arranged that when detecting the vertical planes the calculation is performed using only the X and the Y components but not using the Z components, and that the vertical planes are extracted by specifying straight lines in the X–Y plane, therefore the beneficial effects are obtained that it is possible to reduce the amount of memory which is used, and moreover that it is possible to shorten the processing time. Further, since the number of sorts into the Hough space is reduced by using the mask, thereby the beneficial effects are obtained that it is possible to shorten the processing time, and moreover that it is possible to extract the planes with good accuracy.

The invention of the second aspect comprises a distance image capture device (for example, the distance image capture section 1 of the embodiment) which captures a distance image based upon three dimensional coordinate values obtained for various points upon body surfaces by measuring the distances to said points upon said body surfaces in the forward visual field of a distance sensor; a plane specification device (for example, the steps S11 through S13 and S18 which are performed by the horizontal plane extraction section 5 of the embodiment) which obtains three dimensional coordinate values of three points from a viewpoint picture element in said distance image and two picture elements which are separated by predetermined distances from said viewpoint picture element, and which specifies a plane existing in three dimensional space from these three dimensional coordinate values; and a plane detection device (for example, the steps S14 and S19 which are performed by the horizontal plane extraction section 5 of the embodiment) which detects a plane specified by said plane specification device of which the inclination of the perpendicular vector is within a predetermined angle as a road surface or a floor surface.

According to the invention of second aspect, since when detecting horizontal planes which correspond to a floor surface or to a road surface, among the candidates for the planes which are to be detected, plane detection is performed only using those candidates for which the angle of the perpendicular vector is within a predetermined range, thereby the benefits are obtained that it is possible to reduce the amount of memory which is used, and moreover that it is possible to shorten the processing time. Furthermore, since the number of sorts into the Hough space is reduced using the mask, the benefits are obtained that it is possible further to reduce the processing time, and moreover that it is possible to extract the planes with good accuracy. Yet further, it is also possible to detect slopes or the like which have small inclination as being floor surfaces or road surfaces.

The invention of the third aspect is a vehicle movement control device comprising an image processing device according to the first or second aspect of the invention, wherein said vehicle movement control device comprises a movement control device (for example, the movement control section 8 of the embodiment) which, during vehicle movement, performs movement control by referring to the results of detection by said plane detection device.

According to the invention of the third aspect, since it is arranged that the movement of the vehicle is controlled while referring to the plane detection image and to the distance image, thereby the benefits are obtained that it is possible to control the position of the vehicle with great accuracy, and also that, because it becomes possible to shorten the processing time, the burden of path selection processing upon the movement control device can be reduced.

The invention of the fourth aspect is an autonomously moving robot comprising an image processing device according to the first or second aspect, wherein said autonomously moving robot comprises a movement control device (for example, the movement control section 8 of the embodiment) which, during robot movement, performs movement control by referring to the results of detection by said plane detection device.

According to the invention of the fourth aspect, since it is arranged that the movement of the robot is controlled while referring to the plane detection image and to the distance image, thereby the benefits are obtained that it is possible to control the position of the robot with great accuracy, and also that, because it becomes possible to shorten the processing time, the burden of path selection processing upon the robot can be reduced.

The invention of the fifth aspect comprises distance image capture processing which captures a distance image based upon three dimensional coordinate values obtained for various points upon body surfaces by measuring the distances to said points upon said body surfaces in the forward visual field of a distance sensor; straight line extraction processing (for example, the steps S1 through S6 performed by the vertical plane extraction section 3 of the embodiment) which obtains three dimensional coordinate values of two points from a viewpoint picture element in said distance image and a picture element which is separated by a predetermined distance from said viewpoint picture element, and which extracts a plurality of straight lines in a horizontal plane using two dimensional coordinate values by ignoring the vertical component among these three dimensional coordinate values; and plane detection processing (for example, the step S7 performed by the vertical plane extraction section 3 of the embodiment) which obtains points upon said body surfaces which lie upon various straight lines which have been extracted by said straight line extraction processing, and which detects points which lie upon the same straight line as being upon the same vertical plane.

According to the invention of the fifth aspect, since it is arranged that, when detecting vertical planes which correspond to walls, the calculations are performed only using the X and Y components but not using the Z component, and the vertical planes are extracted by specifying straight lines in the X–Y plane, thereby the benefits are obtained that it is possible to reduce the amount of memory which is used, and moreover that it is possible to shorten the processing time. Furthermore, since the number of sorts into the Hough space is reduced using the mask, the benefits are obtained that it is possible further to reduce the processing time, and moreover that it is possible to extract the planes with good accuracy.

The invention of the sixth aspect comprises distance image capture processing which captures a distance image based upon three dimensional coordinate values obtained for various points upon body surfaces by measuring the distances to said points upon said body surfaces in the forward visual field of a distance sensor; plane specification processing (for example, the steps S11 through S13 and S18 performed by the horizontal plane extraction section 5 of the embodiment) which obtains three dimensional coordinate values of three points from a viewpoint picture element in said distance image and two picture elements which are separated by predetermined distances from said viewpoint picture element, and which specifies a plane existing in three dimensional space from these three dimensional coordinate values; and plane detection processing (for example, the steps S14 and S19 performed by the horizontal plane extraction section 5 of the embodiment) which detects a plane specified by said plane specification processing of which the inclination of the perpendicular vector is within a predetermined angle as a road surface or a floor surface.

According to the invention of the sixth aspect, since when detecting horizontal planes which correspond to a floor surface or to a road surface, among the candidates for the planes which are to be detected, plane detection is performed only using those candidates for which the angle of the perpendicular vector is within a predetermined range, thereby the benefits are obtained that it is possible to reduce the amount of memory which is used, and moreover that it is possible to shorten the processing time. Furthermore, since the number of sorts into the Hough space is reduced using the mask, the benefits are obtained that it is possible further to reduce the processing time, and moreover that it is possible to extract the planes with good accuracy. Yet further, it is also possible to detect slopes or the like which have small inclination as being floor surfaces or road surfaces.

The invention of the seventh aspect is a recording medium which can be read by a computer, upon which is recorded a plane detection program which detects planes in a forward visual field, wherein said plane detection program causes said computer to perform: distance image capture processing which captures a distance image based upon three dimensional coordinate values obtained for various points upon body surfaces by measuring the distances to said points upon said body surfaces in the forward visual field of a distance sensor; straight line extraction processing (for example, the steps S1 through S6 performed by the vertical plane extraction section 3 of the embodiment) which obtains three dimensional coordinate values of two points from a viewpoint picture element in said distance image and a picture element which is separated by a predetermined distance from said viewpoint picture element, and which extracts a plurality of straight lines in a horizontal plane using two dimensional coordinate values by ignoring the vertical component among these three dimensional coordinate values; and plane detection processing (for example, the step S7 performed by the vertical plane extraction section 3 of the embodiment) which obtains points upon said body surfaces which lie upon various straight lines which have been extracted by said straight line extraction processing, and which detects points which lie upon the same straight line as being upon the same vertical plane.

According to the invention of the seventh aspect, since it is arranged that, when detecting vertical planes which correspond to walls, the calculations are performed only using the X and Y components but not using the Z component, and the vertical planes are extracted by specifying straight lines in the X–Y plane, thereby the benefits are obtained that it is possible to reduce the amount of memory which is used, and moreover that it is possible to shorten the processing time. Furthermore, since the number of sorts into the Hough space is reduced using the mask, the benefits are obtained that it is possible further to reduce the processing time, and moreover that it is possible to extract the planes with good accuracy.

The invention of the eighth aspect is a recording medium which can be read by a computer, upon which is recorded a plane detection program which detects planes in a forward visual field, wherein said plane detection program causes said computer to perform: distance image capture processing which captures a distance image based upon three dimensional coordinate values obtained for various points upon body surfaces by measuring the distances to said points upon said body surfaces in the forward visual field of a distance sensor; plane specification processing (for example, the steps S11 through S13 and S18 performed by the horizontal plane extraction section 5 of the embodiment) which obtains three dimensional coordinate values of three points from a viewpoint picture element in said distance image and two picture elements which are separated by predetermined distances from said viewpoint picture element, and which specifies a plane existing in three dimensional space from these three dimensional coordinate values; and plane detection processing (for example, the steps S14 and S19 performed by the horizontal plane extraction section 5 of the embodiment) which detects a plane specified by said plane specification processing of which the inclination of the perpendicular vector is within a predetermined angle as a road surface or a floor surface.

According to the invention of the eighth aspect, since when detecting horizontal planes which correspond to a floor surface or to a road surface, among the candidates for the planes which are to be detected, plane detection is performed only using those candidates for which the angle of the perpendicular vector is within a predetermined range, thereby the benefits are obtained that it is possible to reduce the amount of memory which is used, and moreover that it is possible to shorten the processing time. Furthermore, since the number of sorts into the Hough space is reduced using the mask, the benefits are obtained that it is possible further to reduce the processing time, and moreover that it is possible to extract the planes with good accuracy. Yet further, it is also possible to detect slopes or the like which have small inclination as being floor surfaces or road surfaces.

As explained above, since according to the inventions described in the first, fifth, and seventh aspects it is arranged that, when detecting vertical planes which correspond to walls, calculations are performed only using the X and Y components but not using the Z component, and the vertical planes are extracted by specifying straight lines in the X-Y plane, thereby the benefits are obtained that it is possible to reduce the amount of memory which is used, and moreover that it is possible to shorten the processing time. Furthermore, since the number of sorts into the Hough space is reduced using the mask, the benefits are obtained that it is possible further to reduce the processing time, and moreover that it is possible to extract the planes with good accuracy.

Yet further, since according to the inventions described in the second, sixth, and eighth aspects it is arranged that, when detecting horizontal planes which correspond to a floor surface or to a road surface, among the candidates for the planes which are to be detected, plane detection is performed only using those candidates for which the angle of the perpendicular vector is within a predetermined range, thereby the benefits are obtained that it is possible to reduce the amount of memory which is used, and moreover that it is possible to shorten the processing time. Furthermore, since the number of sorts into the Hough space is reduced using the mask, the benefits are obtained that it is possible further to reduce the processing time, and moreover that it is possible to extract the planes with good accuracy. Yet further, it is also possible to detect slopes or the like which have small inclination as being floor surfaces or road surfaces.

Even further, since according to the invention of the third aspect it is arranged that the movement of the vehicle is controlled while referring to the plane detection image and to the distance image, thereby the benefits are obtained that it is possible to control the position of the vehicle with great accuracy, and also that, because it becomes possible to shorten the processing time, the burden of path selection processing upon the movement control device can be reduced.

Even yet further, since according to the invention of the fourth aspect it is arranged that the movement of the robot is controlled while referring to the plane detection image and to the distance image, thereby the benefits are obtained that it is possible to control the position of the robot with great accuracy, and also that, because it becomes possible to shorten the processing time, the burden of path selection processing upon the robot can be reduced.

DETAILED DESCRIPTION OF THE INVENTION

In the following, an image processing device according to an embodiment of the present invention will be explained with reference to the figures.

Figure 1:
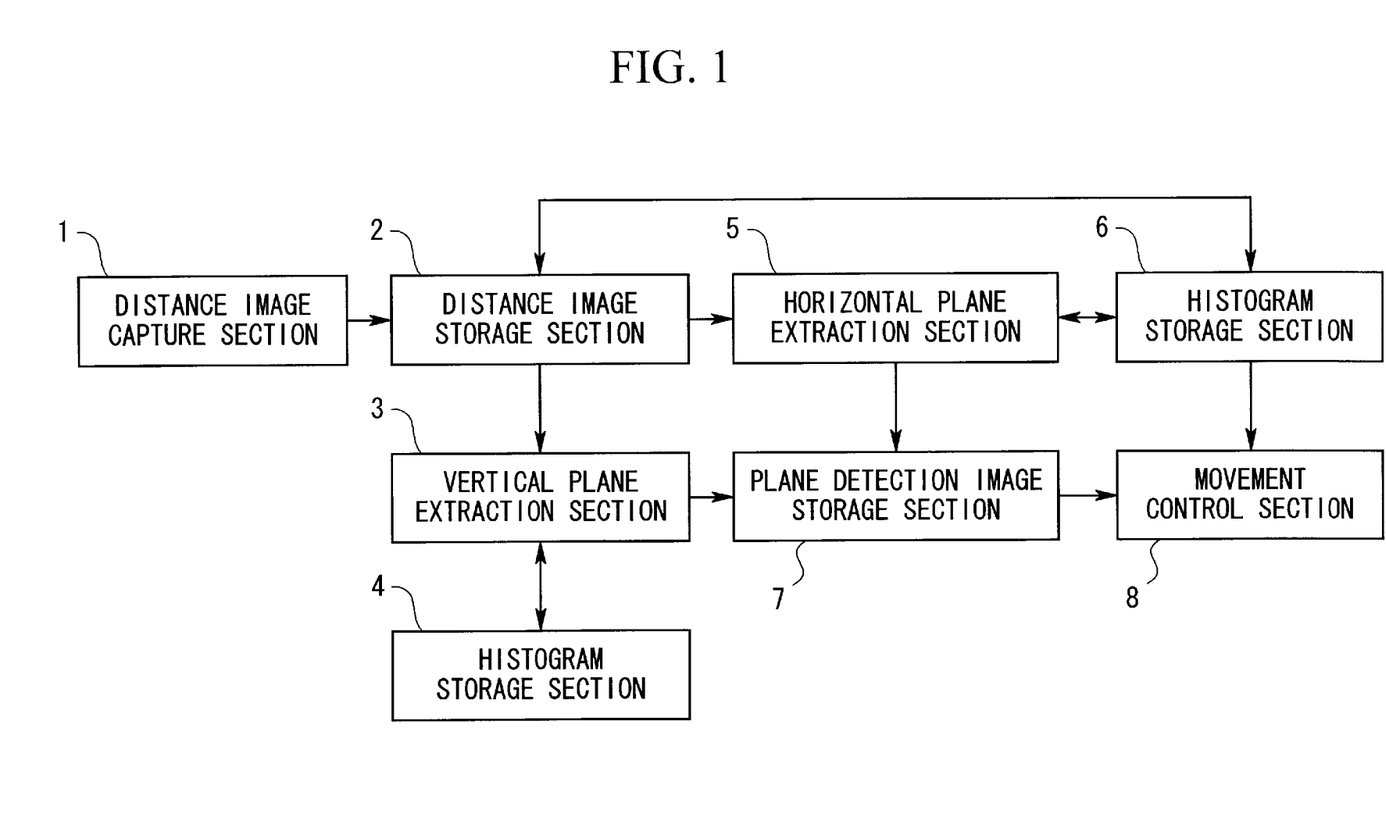
FIG. 1 is a block diagram showing the structure of an embodiment of the present invention.

FIG. 1 is a block diagram showing the structure of this embodiment. In this figure, the reference symbol 1 is a distance image capture section which captures a distance image of the bodies which are present in a visual field along a direction of movement in which a robot or vehicle is moving. A distance sensor of this distance image capture section 1 comprises two CCD cameras or radar units which employ electromagnetic waves. The reference symbol 2 is a distance image storage section which stores one frame of the distance image which has been taken by the distance image capture section 1. The reference symbol 3 is a vertical plane extraction section which, in the processing of the distance image which has been stored in the distance image storage section 2, extracts vertical planes which correspond to walls. The reference symbol 4 is a histogram storage section which stores a histogram which is used in the sorting of parameters which are determined from distance data for two points. The reference symbol 5 is a horizontal plane extraction section which extracts a horizontal plane which corresponds to a floor surface or road surface in the processing of a distance image which has been stored in the distance image storage section 2. The reference symbol 6 is a histogram storage section which stores a histogram which is used in the sorting of parameters which are determined from distance data for three points. The reference symbol 7 is a plane detection image storage section which stores plane information resulting from extraction by the vertical plane extraction section 3 and the horizontal plane extraction section 5. And the reference symbol 8 is a movement control section which controls the movement of a robot or a vehicle or the like while referring to the plane detection image which has been stored in the plane detection image storage section 7 and to the distance image which is stored in the distance image storage section 2.

Herein, the image processing device shown in FIG. 1 will be explained in terms of its being equipped to an autonomously moving robot which moves within a room.

Here, it will be supposed that a coordinate system as explained below is being used. The distance direction forward from the robot will be taken as the X axis, the direction to the left and right of the robot will be taken as the Y axis, and the vertical direction will be taken as the Z axis, with these three axes being mutually perpendicular. Further, the quantities termed distances below are straight line distances from the distance image capture section 1 to various objects. Accordingly, the distance image data are collections of 3 dimensional coordinate values of points upon surfaces of objects sensed in the visual field of the distance image capture section 1.

Figure 2:
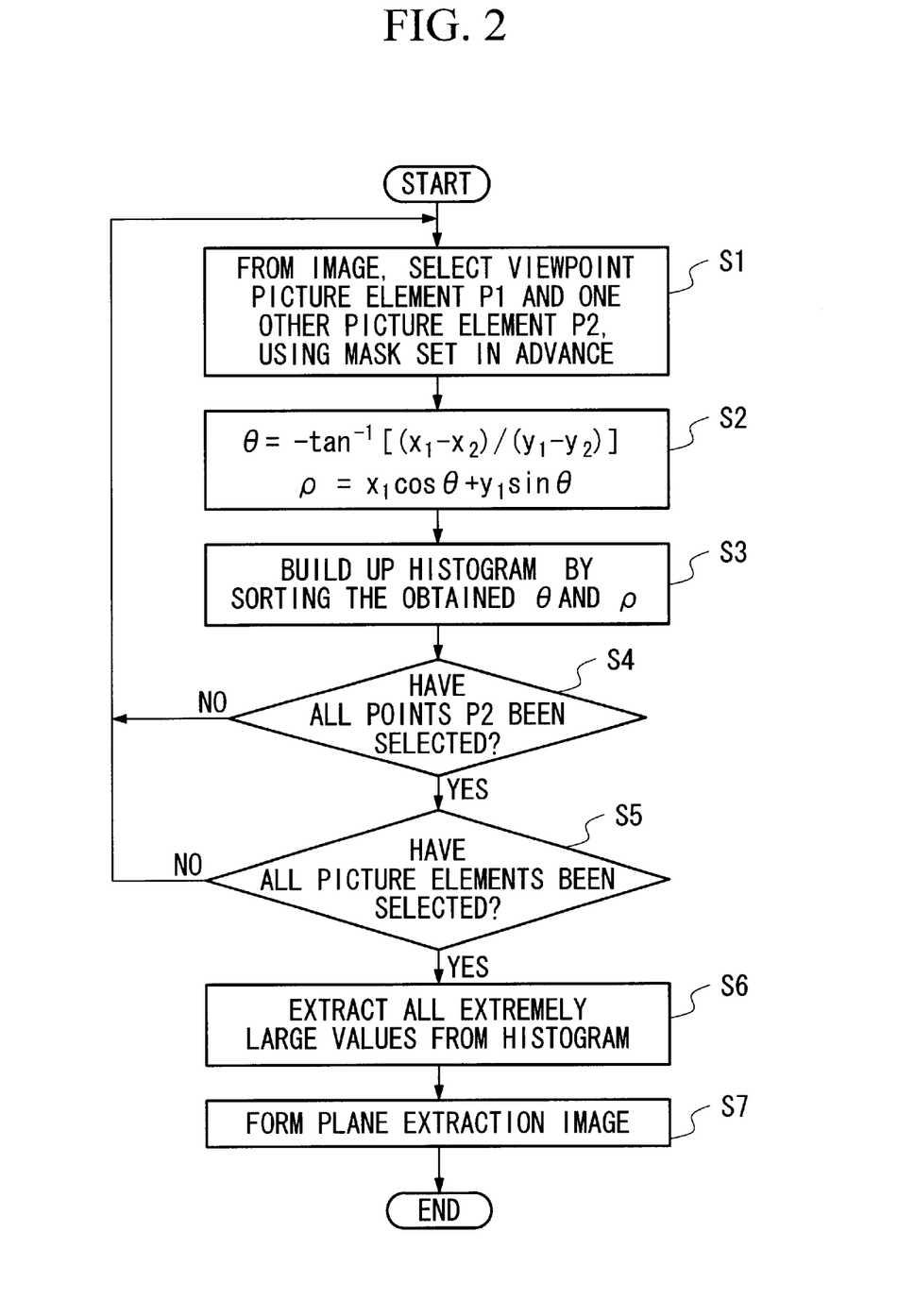
FIG. 2 is a flow chart showing the operation of a vertical plane extraction section 3 shown in FIG. 1.

Next, the operation of the image processing device shown in FIG. 1 will be explained with reference to the figures. FIG. 2 is a flow chart showing the operation of the vertical plane extraction section 3 in extracting a vertical plane from a distance image.

First, the distance image capture section 1 captures a distance image, A/D converts this data, and stores it in the distance image storage section 2 for each point sensed. Here, as one example, the distances of the points which are sensed will be supposed to be expressed as 8 bit values (i.e., by 256 levels). Although the picture elements of a normal image are values which specify the brightness of the surface of an object which is present in the visual field of a sensor, by contrast, the picture elements of a distance image are values which specify by 256 levels the distance of the surface of an object which is present in the visual field of the sensor. Accordingly, it is possible to specify the direction to a single point upon the surface of an object which is present in three dimensional space from the origin of coordinates according to the position of the picture element in the distance image, and moreover it is possible to specify a single point upon the surface of an object which is present in three dimensional space according to the distance information possessed by this picture element. It should be noted that, if greater accuracy is required, it is also possible to enhance the accuracy by combining radar units, or the like. Furthermore, it would also be acceptable to use the output values of the distance sensor just as they are, without expressing the distance data by 256 levels.

Figure 4A:
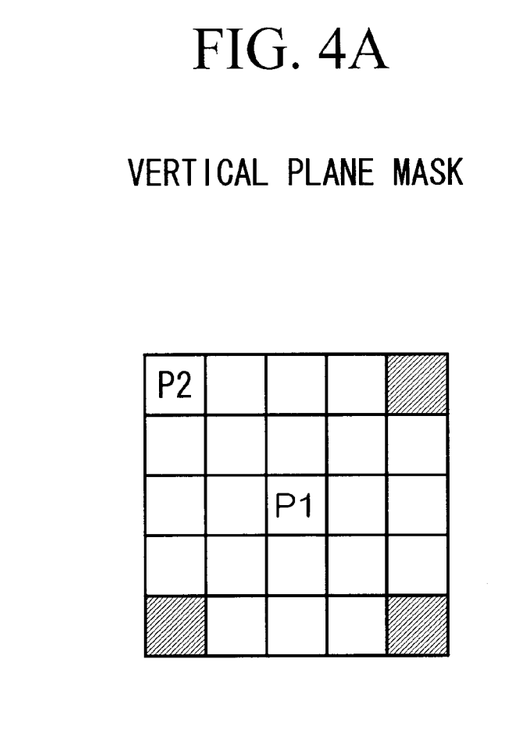
FIGS. 4A and 4B are explanatory figures showing an example of a mask which is used by the vertical plane extraction section 3 and the horizontal plane extraction section 5 shown in FIG. 1.

Next, after the distance image has been stored in the distance image storage section 2, the vertical plane extraction section 3 reads out one frame of distance data, and (in the step S1) selects, using a mask which is set in advance, a viewpoint picture element in the image (shown here by P1) and one other picture element (shown here by P2). An example of a mask used in this step S1 is shown in FIG. 4A. As shown in this figure, the vertical plane mask is made up of 5×5 picture elements, and the central one of these elements is the point P1, while the elements at its four corners become the points P2.

Next, the vertical plane extraction section 3 derives (in the step S2) the parameters θ and ρ in the Hough space from the two points P1 ($x_1$, $y_1$, $z_1$) and P2 ($x_2$, $y_2$, $z_2$) which have been selected by this mask, according to Equations (1) and (2).

$$\theta = -\tan^{-1}[(x_1-x_2)/(y_1-y_2)] \quad \text{<EQUATION 1>}$$

$$\rho = x_1 \cos\theta + y_2 \sin\theta \quad \text{<EQUATION 2>}$$

As shown by Equations (1) and (2), the parameters θ and ρ are calculated only from the X components and the Y components, without using the Z components. Since the processing shown in FIG. 2 is processing for extracting vertical planes such as walls and the like, it is possible for it to ignore the Z components. In particular, inside a room, since almost all the planes are vertical ones, it is possible to minimize the influence exerted upon the results of plane extraction processing even if the Z components are ignored. Accordingly, it is possible to extract the vertical planes in three dimensional space by projecting the points sensed upon the surfaces of bodies, which have three dimensional coordinate values, into the X-Y plane, and by extracting straight lines in the X-Y plane from the points which are thus projected. Here, the parameter θ which is extracted according to Equations (1) and (2) is the angle around a vertical axis of the straight line which is being extracted, while the parameter ρ is the distance between this straight line and the origin.

Figure 5:
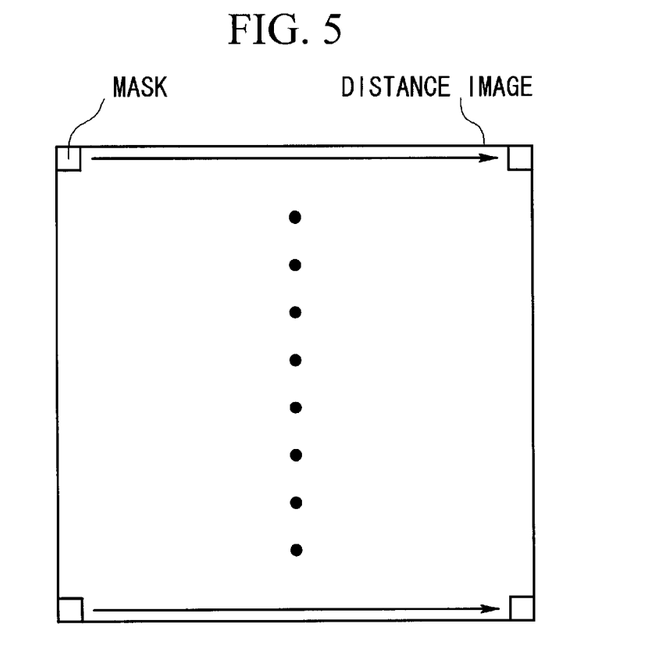
FIG. 5 is an explanatory figure showing an example of the scanning direction for a distance image, for processing by the vertical plane extraction section 3 and the horizontal plane extraction section 5 shown in FIG. 1.

Next, the vertical plane extraction section 3 sorts (ballots) (in the step S3) the parameters θ and ρ which were obtained in the step S2 into a three dimensional histogram which is stored in the histogram storage section 4. And next the vertical plane extraction section 3 performs (in the step S4), with the same point P1, the processing of the steps S1 through S3 for the other three points P2 (the positions shown by the diagonal hatching in FIG. 4A). And then the vertical plane extraction section 3, using the mask shown in FIG. 4A, repeats (in the step S5) the processing of the steps S1 through S3 while, as shown in FIG. 5, shifting the position of P1 by one picture element at a time through the entire distance image, from the position at the upper left of the distance image to the position in its lower right. A three dimensional histogram is built up in the histogram storage section 4 by this processing.

Next, in the step S6, the vertical plane extraction section 3 refers to the histogram storage section 4 and extracts all the maximum values. And it obtains the parameters θ and ρ which have these maximum values, and specifies straight lines upon the X-Y plane from these θ and ρ. Accordingly, the number of these straight lines thus specified is the same as the number of maximum values.

Next, according to whether or not the points which have been projected into the X-Y plane from the points having three dimensional coordinate values which were sensed are points upon the straight lines which have previously been specified, the vertical plane extraction section 3 decides whether or not these sensed points are points upon planes. And it extracts vertical planes in the distance image by performing this decision upon each of the specified straight lines in turn, and from these results it forms (in the step S7) a plane extraction image. It would also be acceptable for this plane extraction image to be formed by classifying by color the sensed points which lie upon the same straight lines into each of the specified straight lines, or the like. By this processing, a plane extraction image is obtained in which only the vertical planes are colored, and the portions which are not vertical planes are not colored.

Figure 3:
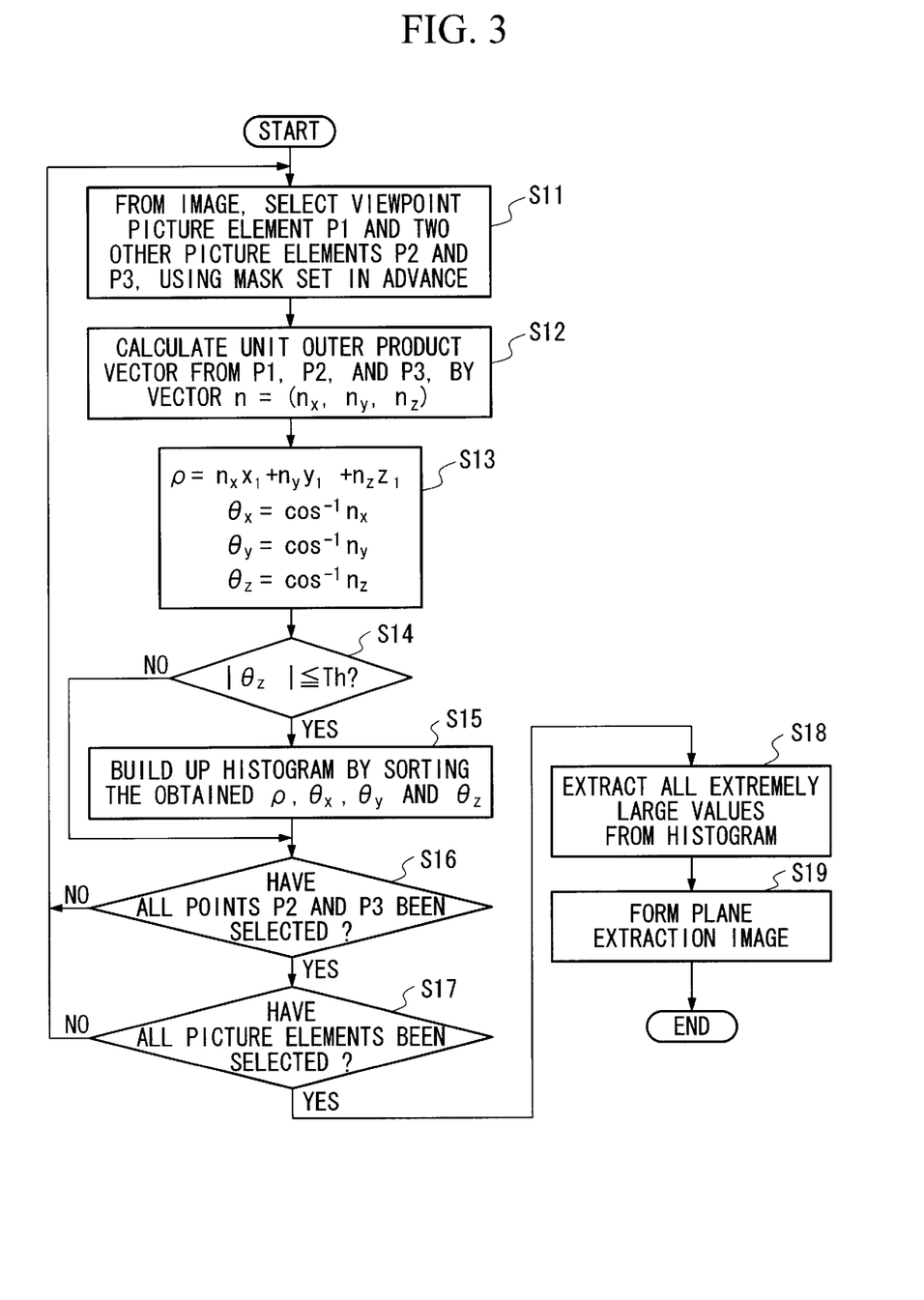
FIG. 3 is a flow chart showing the operation of a horizontal plane extraction section 5 shown in FIG. 1.

Next, referring to FIG. 3, the operation of the horizontal plane extraction section 5 for extracting a horizontal plane which corresponds to a floor or the like will be explained. FIG. 3 is a flow chart showing the operation of the horizontal plane extraction section 5 for extracting this horizontal plane. By horizontal plane here is meant a floor surface or road surface, and this includes a floor surface or road surface which has a realistic slope (for example, a maximum slope of 10 degrees).

Figure 4B:
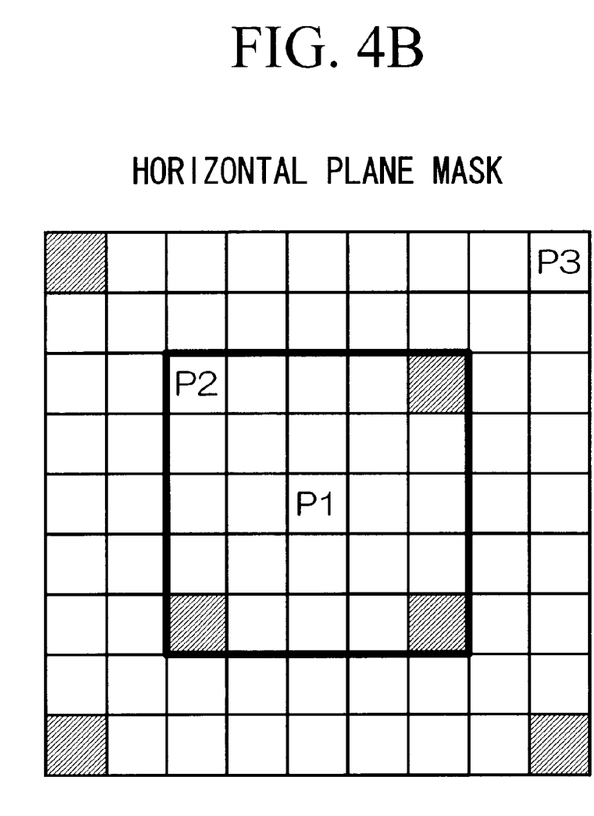

First, after the distance image has been stored in the distance image storage section 2, the horizontal plane extraction section 5 reads out one frame of distance data, and (in the step S11) selects, using a mask which is set in advance, a viewpoint picture element in the image (shown here by P1) and two other picture elements (shown here by P2 and P3). An example of a mask used in this step S11 is shown in FIG. 4B. As shown in this figure, the horizontal plane mask is made up of 9×9 picture elements, and its central 5×5 picture element portion is the same as the vertical plane mask shown in FIG. 4A, while moreover the elements at the four corners of the 9×9 picture elements of this mask become elements P3.

Next, the horizontal plane extraction section 5 derives (in the step S12) the unit outer product vector n from the three points P1 ($x_1$, $y_1$, $z_1$), P2 ($x_2$, $y_2$, $z_2$) and P3 ($x_3$, $y_3$, $z_3$) which have been selected by this mask, according to Equations (3) and (4). In the explanation of the following Equations, the expression "vector n" will be used for the vector.

The unit outer product vector n is obtained by first obtaining an outer product vector n-tmp according to Equation (3), and by then normalizing it according to Equation (4).

Outer product vector $n\text{-tmp}=((y_2-y_1)(z_3-z_1)-$ $(z_2-z_1)(y_3-y_1)$, $(z_2-z_1)(x_3-x_1)-$ $(x_2-x_1)(z_3-z_1)$, $(y_2-$ $y_1)(z_3-z_1)-(z_2-z_1)(y_3$ $-y_1))$                                                         <EQUATION 3>

Unit outer product vector $n = \text{vector } n_{tmp}$ $/|\text{vector } n_{tmp}|$                                                             <EQUATION 4>

The unit outer product vector n normalized according to Equation (4) whose magnitude is 1 becomes the unit outer product vector $n=(n_X, n_Y, n_Z)$, and this vector is the vector perpendicular to the plane which is determined by the three points selected previously.

Next, the horizontal plane extraction section 5 derives (in the step S13) parameters ρ, θx, θy and θz from this unit outer product vector n which has been obtained, according to Equations (5), (6), (7), and (8).

$\rho = n_X x_1 + n_Y y_1 + n_Z z_1$                      <EQUATION 5>

$\theta x = \cos^{-1} n_X$                                      <EQUATION 6>

$\theta y = \cos^{-1} n_Y$                                      <EQUATION 7>

$\theta z = \cos^{-1} n_Z$                                      <EQUATION 8>

Here, the parameter ρ is the distance from the origin to the plane which is being extracted, while the parameters θx, θy and θz are the respective angles which correspond to the direction cosines for each component of the perpendicular vector.

Next, the horizontal plane extraction section 5 decides (in the step S14) whether or not the angle θz which corresponds to the direction cosine of the Z component of the perpendicular vector satisfies the condition $|\theta z| \leq Th$. Here Th is a threshold value, and is the maximum angle for the slope of the floor surface or road surface. Since usually the floor surface in a room, even if it slopes, has a maximum angle of around 10 degrees, therefore it is desirable to set this value Th to about 10 degrees.

Next, if in the step S14 the condition $|\theta z| \leq Th$ is satisfied, then the horizontal plane extraction section 5 sorts (in the step S15) the parameters ρ, θx, θy and θz which were obtained in the step S13 into a four dimensional histogram which is stored in the histogram storage section 6. On the other hand, if the condition $|\theta z| \leq Th$ is not satisfied, then the flow of control is transferred to the step S16.

Next, the horizontal plane extraction section 5 performs (in the step S16) the processing of the steps S11 through S15 for the other three points P2 and the other three points P3 with respect to the point P1 (at the positions shown by the diagonal hatching in FIG. 4B). Moreover, using the mask shown in FIG. 4B, as shown in FIG. 5, the horizontal plane extraction section 5 shifts (in the step S17) the position of P1 through the entire distance image by one picture element at a time, from the upper left position in the distance image to its lower right position, and repeats the processing of the steps S11 through S16. A four dimensional histogram is built up in the histogram storage section 6 by this processing.

However, the sorting is only performed when $|\theta z| \leq Th$ is satisfied.

Next (in the step S18) the horizontal plane extraction section 5 refers to the histogram storage section 6, and extracts all the maximum values. And it obtains the parameters ρ, θx, θy and θz which have these maximum values, and specifies planes in three dimensional space from these ρ, θx, θy and θz. Accordingly, the number of these planes thus specified is the same as the number of maximum values.

Next, the horizontal plane extraction section 5 forms (in the step S19) a plane extraction image from the specified horizontal planes. It would also be acceptable for this plane extraction image to be formed by classifying the points sensed which lie upon the specified planes into each of the specified planes by color. By this processing, a plane extraction image is obtained in which only the horizontal planes are colored, and the portions which are not horizontal planes are not colored.

Figure 6:
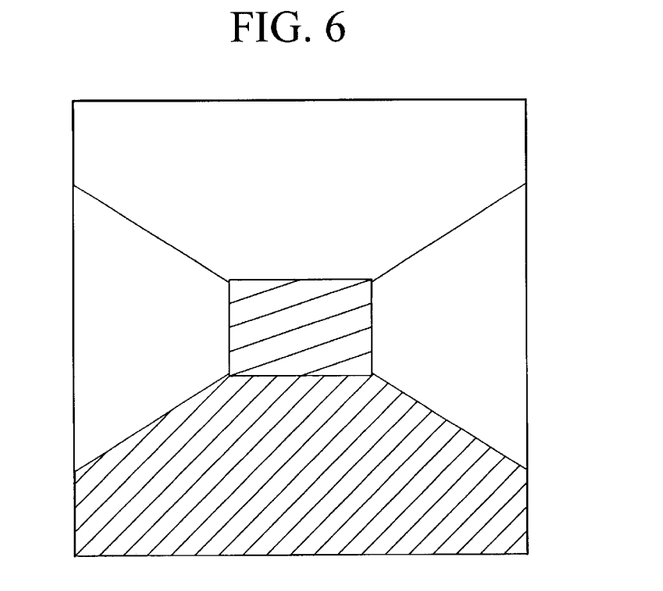
FIG. 6 is an explanatory figure showing an example of a plane detection image which has been stored in a plane detection image storage section 7 shown in FIG. 1.

It should be noted that it would also be acceptable for the vertical plane extraction processing shown in FIG. 2 and the horizontal plane extraction processing shown in FIG. 3 to operate simultaneously and for their results to be combined together, so that a plane extraction image was formed from the vertical and horizontal planes which were thus classified by color. Further, it would also be acceptable for the distance image capture section 1 to capture another distance image at the time point at which the vertical plane extraction section 3 and the horizontal plane extraction section 5 have completed the reading out of the distance data which is stored in the distance image storage section 2, thereby to renew the contents of the distance image storage section 2. And the contents of the plane detection image storage section 7 are renewed by repeating the above described processing. An example of the plane detection image which is stored in the plane detection image storage section 7 is shown in FIG. 6.

On the other hand, the movement control section 8 performs setting of the movement path and performs control of the movement of the robot by recognizing the planes while referring to the contents of the plane detection image storage section 7 and the distance image storage section 2 which are recurrently renewed moment by moment.

Since in this manner, when detecting vertical planes, the Z components are not used but rather calculation is performed using only the X and Y components, and it is arranged that the vertical planes which correspond to walls are extracted by specifying straight lines in the X-Y plane using a three dimensional histogram, thereby it is possible to reduce the amount of memory which must be used, and also it is possible to shorten the processing time. Further since it is arranged that, when detecting the horizontal plane which corresponds to the floor surface or the road surface, among the candidates for the planes which are to be detected, sorting of the four dimensional histogram is performed only using those candidates for which the angle of the perpendicular vector is within a predetermined range, thereby it is possible further to reduce the amount of memory which must be used, and also it is possible further to shorten the processing time. Yet further, since the detection processing for the vertical planes and for the horizontal planes is separated, and it is arranged that these operations can be performed simultaneously in parallel, thereby it becomes possible yet further to enhance the efficiency of processing. Moreover, since it is arranged that the movement of the robot is controlled while referring to the plane detection image and to the distance image, thereby, along with it being possible accurately to perform control of the position of the robot, it becomes possible to reduce the burden which the path selection processing imposes upon the robot, since it has become possible to shorten the processing time. Furthermore, since the sorting range is limited by using a mask, along with enabling shortening of the processing time, the accuracy of plane detection is enhanced.

It should be understood that it would also be acceptable for the program for implementing the functions of the processing section of FIGS. 2 and 3 to be recorded upon a recording medium which can be read by a computer, and for the plane detection processing to be performed by this program which is thus recorded upon this recording medium being read by a computer system and being executed thereby. Moreover, the term "computer system" is here to be understood as including an OS and hardware such as peripheral devices and the like. Further, if the www-system is taken advantage of, "computer system" should also be understood as including an environment offered by a home page (or a display environment). Further, by "recording medium which can be read by a computer", there is meant a portable medium such as a floppy disk, an opto-magnetic disk, a ROM, a CD-ROM or the like, or a storage device internal to a computer system such as a hard disk or the like. Yet further, this term "recording medium which can be read by a computer", is also intended to include a device which maintains the program for a certain time period, such as a volatile memory (RAM) internal to a computer system which operates as a server or a client when the program is transmitted via a network such as the internet or the like, or via a communication line such as a telephone line or the like.

Further, it would also be acceptable for the above described program to be transmitted from a computer system which stores this program in a storage device or the like to another computer system via a transmission medium, or by a transmission wave within a transmission medium. Here, the term "transmission medium" which transmits the program means a medium which is endowed with the function of transmitting information, such as a network (communication net) such as the internet or the like, or a communication line (communication channel) such as a telephone line or the like. Further, it would also be acceptable for the above described program to be one for implementing a portion of the above described functions. Yet further, a so called differential file (differential program) which is able to implement the above described function in combination with a program which is already recorded in the computer system, would also be acceptable.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. An image processing device, comprising:
   a distance image capture device which captures a distance image based upon three dimensional coordinate values obtained for various points upon body surfaces by measuring the distances to said points upon said body surfaces in the forward visual field of a distance sensor;
   a straight line extraction device which obtains three dimensional coordinate values of two points from a viewpoint picture element in said distance image and a picture element which is separated by a predetermined distance from said viewpoint picture element, and which extracts a plurality of straight lines in a horizontal plane using two dimensional coordinate values by ignoring the vertical component among these three dimensional coordinate values; and
   a plane detection device which obtains points upon said body surfaces which lie upon various straight lines which have been extracted by said straight line extraction device, and which detects points which lie upon the same straight line as being upon the same vertical plane.

2. A vehicle movement control device comprising an image processing device according to claim 1, wherein said vehicle movement control device comprises a movement control device which, during vehicle movement, performs movement control by referring to the results of detection by said plane detection device.

3. An autonomously moving robot comprising an image processing device according to claim 2, wherein said autonomously moving robot comprises a movement control device which, during robot movement, performs movement control by referring to the results of detection by said plane detection device.

4. An image processing device, comprising:
   a distance image capture device which captures a distance image based upon three dimensional coordinate values obtained for various points upon body surfaces by measuring the distances to said points upon said body surfaces in the forward visual field of a distance sensor;
   a plane specification device which obtains three dimensional coordinate values of three points from a viewpoint picture element in said distance image and picture elements which are separated by predetermined distances from said viewpoint picture element, and which specifies a plane existing in three dimensional space from these three dimensional coordinate values; and:
   a plane detection device which detects a plane specified by said plane specification device of which the inclination of the perpendicular vector is within a predetermined angle as a road surface or a floor surface.

5. A vehicle movement control device comprising an image processing device according to claim 4, wherein said vehicle movement control device comprises a movement control device which, during vehicle movement, performs movement control by referring to the results of detection by said plane detection device.

6. An autonomously moving robot comprising an image processing device according to claim 4, wherein said autonomously moving robot comprises a movement control device which, during robot movement, performs movement control by referring to the results of detection by said plane detection device.

7. A plane detection method, comprising:

distance image capture processing which captures a distance image based upon three dimensional coordinate values obtained for various points upon body surfaces by measuring the distances to said points upon said body surfaces in the forward visual field of a distance sensor;

straight line extraction processing which obtains three dimensional coordinate values of two points from a viewpoint picture element in said distance image and a picture element which is separated by a predetermined distance from said viewpoint picture element, and which extracts a plurality of straight lines in a horizontal plane using two dimensional coordinate values by ignoring the vertical component among these three dimensional coordinate values; and plane detection processing which obtains points upon said body surfaces which lie upon various straight lines which have been extracted by said straight line extraction processing, and which detects points which lie upon the same straight line as being upon the same vertical plane.

8. A plane detection method, comprising:

distance image capture processing which captures a distance image based upon three dimensional coordinate values obtained for various points upon body surfaces by measuring the distances to said points upon said body surfaces in the forward visual field of a distance sensor;

plane specification processing which obtains three dimensional coordinate values of three points from a viewpoint picture element in said distance image and picture elements which are separated by predetermined distances from said viewpoint picture element, and which specifies a plane existing in three dimensional space from these three dimensional coordinate values; and:

plane detection processing which detects a plane specified by said plane specification processing of which the inclination of the perpendicular vector is within a predetermined angle as a road surface or a floor surface.

9. A recording medium which can be read by a computer, upon which is recorded a plane detection program which detects planes in a forward visual field, wherein said plane detection program causes said computer to perform:

distance image capture processing which captures a distance image based upon three dimensional coordinate values obtained for various points upon body surfaces by measuring the distances to said points upon said body surfaces in the forward visual field of a distance sensor;

straight line extraction processing which obtains three dimensional coordinate values of two points from a viewpoint picture element in said distance image and a picture element which is separated by a predetermined distance from said viewpoint picture element, and which extracts a plurality of straight lines in a horizontal plane using two dimensional coordinate values by ignoring the vertical component among these three dimensional coordinate values; and plane detection processing which obtains points upon said body surfaces which lie upon various straight lines which have been extracted by said straight line extraction processing, and which detects points which lie upon the same straight line as being upon the same vertical plane.

10. A recording medium which can be read by a computer, upon which is recorded a plane detection program which detects planes in a forward visual field, wherein said plane detection program causes said computer to perform:

distance image capture processing which captures a distance image based upon three dimensional coordinate values obtained for various points upon body surfaces by measuring the distances to said points upon said body surfaces in the forward visual field of a distance sensor;

plane specification processing which obtains three dimensional coordinate values of three points from a viewpoint picture element in said distance image and picture elements which are separated by predetermined distances from said viewpoint picture element, and which specifies a plane existing in three dimensional space from these three dimensional coordinate values; and:

plane detection processing which detects a plane specified by said plane specification processing of which the inclination of the perpendicular vector is within a predetermined angle as a road surface or a floor surface.

* * * * *